Patented Oct. 1, 1935

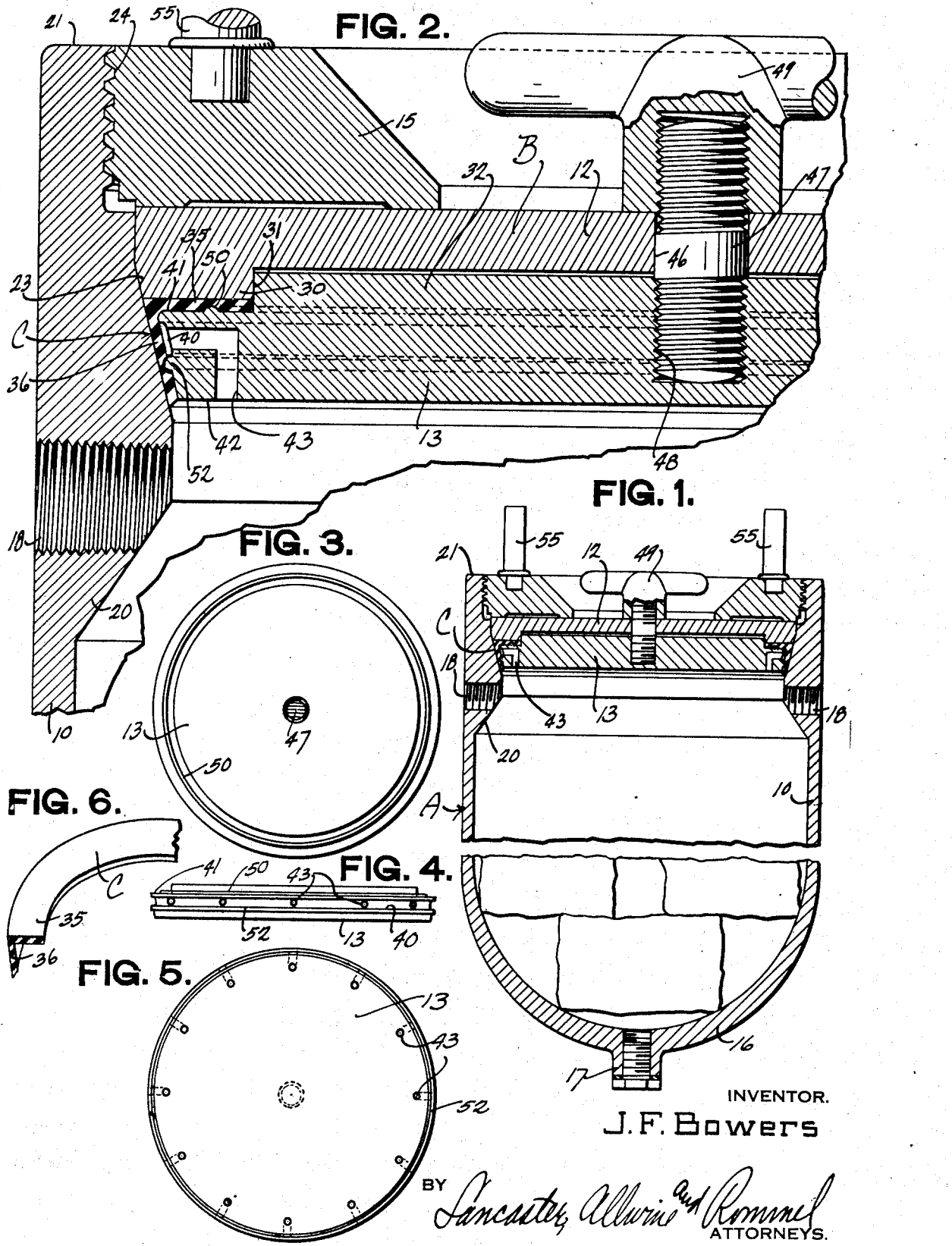

2,016,223

UNITED STATES PATENT OFFICE 2,016,223

LIQUEFIER TANK

John Frederick Bowers, Harrisburg, Pa., assignor to Harrisburg Steel Corporation, a corporation of Pennsylvania Application June 7, 1933, Serial No. 674,744

18 Claims. (Cl. 220—46)

This invention relates to improvements in liquefier tanks, particularly well adapted to receive fluids under superatmospheric pressure.

The present invention relates to improved means to effectively seal a closure upon a tank which is adapted to receive fluids under superatmospheric pressure or subatmospheric pressure. Mainly, the invention is directed to commercially designated liquefier tanks adapted to receive carbon dioxide in solid form, which in changing to vapor phase builds up pressure. It is extremely difficult to effect a perfect seal at the juncture of the closure with the body of the tank. In the present invention this is accomplished by providing a gasket which is extremely practical, and associated with the closure in such manner that it may be effectively clamped across the juncture of the closure with the body of the tank, and mechanically compressed at each side of said juncture. Means is provided to admit pressures to the inside of the gasket in order to inflate it internally at an annular zone between the compressed areas for the purpose of forcing the gasket into a tight seal with the juncture of the closure and the body of the tank. This has been accomplished without subjecting the gasket exteriorly to pressures within the tank at a zone between the compressed areas of the gasket. Thus the entire area at the outer side of the gasket between the mechanically compressed zones of the gasket are subjected to far less pressure than the tank pressure existing at the inner side of the gasket.

Other objects and advantages consist in the adaptation of the above structure to a practical type of closure wherein the gasket is assembled upon the closure in such relation that it may be effectively seated in the body of the tank.

In the drawing, wherein similar reference characters designate corresponding parts throughout the several views, Figure 1 is a fragmentary sectional view of a high pressure tank, which has been quite generally referred to as a liquefier tank adapted to receive phase changeable material such as solid carbon dioxide, and showing more particularly the improved gasket clamping structure in association with the tank body and closure.

Figure 2 is a fragmentary sectional view of an upper corner of the tank and closure showing more particularly the gasket structure.

Figure 3 is a top plan view of one of the complementary parts of the closure, showing more particularly a gasket seating surface thereon.

Figure 4 is an edge elevation of the closure part illustrated in Figure 3.

Figure 5 is a bottom plan view of the closure part illustrated in Figures 3 and 4.

Figure 6 is a fragmentary portion of a compressible gasket.

In the drawing, wherein for the purpose of illustration is shown only a preferred embodiment of the invention, the liquefier tank structure A includes a cylinder shell or tank body 10 having a closure B consisting of a main closure plate 12 and a complementary disc or member 13 associated therewith for effectively clamping an improved type of gasket C in position. A closure clamping and retaining ring 15 is provided for forcing the closure B and gasket C in position upon the tank body.

The tank body, closure portions 12 and 13, and preferably also the retaining ring or member 15 are of forged metal. The cylinder shell 10 is preferably a seamless forging with a dome-shaped bottom 16 having a drain nipple 17 at its lower end and wherein a plug or drain valve may be placed. This seamless shell forging may be manufactured after the method set forth in my U. S. Patent No. 1,948,437. It is also provided with suitable relief and gas control valves placed in the tapped openings 18, in accordance with the arrangement described in a co-pending application, Serial No. 589,273, filed January 27, 1932.

The shell 10 is open at its upper end, and to provide the closure and gasket seat it is preferably inwardly flanged at 20 below the top edge 21 thereof. This flange 20 is tapered to provide a flaring downwardly convergent gasket and closure seat 23 facing the opening into the tank. The opening in the tank above the tapered seat 23 is of greater diameter than the maximum diameter of said seat 23 and may be screw threaded as at 24, either with continuous or interrupted threads, to receive the closure clamping and locking ring 15. To prevent rotation of the closure B with the locking ring 15, during placement of the latter, a suitable retaining pin and slot connection of the closure with the tank body may be provided as is set forth in a co-pending application, Serial No. 658,611, filed February 25, 1933.

The closure B preferably consists of the complementary portions 12 and 13. The former is the main part of the closure and comprises the plate-like body portion having a depending annular flange 30 at the outer peripheral portion thereof to define a socket 31 wherein the raised hub 32 of the other closure part 13 may be received to properly center the parts 12 and 13. The part 12 at its circumferential edge is shaped to conform to the tapered seat 23 of the tank body, which it contacts when the closure is in position.

It is the main purpose of the complementary closure parts 12 and 13 to effectively clamp the gasket C in position therewith so that it will effectively seat against the tapered surface 23 of the tank body when the closure is lowered into position.

The gasket C is of a compressible type, preferably rubber, although it may be of other materials well known to those skilled in the art. In cross section it is angular, that is, preferably consisting of a flat annular portion 35 adapted to be clamped between the closure parts 12 and 13, and the ring-shaped portion 36 adapted to be clamped between the closure part and the tapered seat 23, as is shown in Figure 2. A cross section of the gasket shows that the portions 35 and 36 are arranged in acute angled channel providing relation; their juncture being intended to seat snugly across the juncture of the closure part 12 with the seat 23 of the body 10, as is shown in Figure 2 of the drawing.

It is intended in the present invention to take advantage of pressures built up in the tank incident to the phase changing material which it is to receive, for the purpose of inflating the gasket, or rather forcing it into tight sealing contact across the juncture of the closure with the tank body. To that end the closure part 13 at its outer peripheral edge is provided with an annular groove or recess 40 below the surface 41 and above the bottom surface 42, into which suitable ducts 43 open; the ducts 43 extending through the closure part 13 and opening at the bottom thereof into the tank when the closure is in place.

It should be noted that the parts 12 and 13 of the closure are bolted together for clamping the flange 35 of the gasket C in position. To that end the closure part 12 has a central opening 46 which freely receives a portion of a stud bolt 47 therethrough. This stud bolt 47 is screw threaded at 48 into the body of the closure part 13. A handled nut 49 is adjustably threaded upon the upper threaded portion of the stud 47 and of course clamps against the upper surface of the part 12 to bring the parts 12 and 13 into clamping assemblage with the portion 35 of the gasket C.

It is to be particularly noted that the outer peripheral edge of the closure part 13 is tapered in substantial parallelism to the seat 23 when the closure is in place in the tank, but normally closely spaced from the seat 23 when the tapered surface of the closure part 12 engages said seat 23. It is in this space that the flange or wall portion 36 of the gasket C is disposed in clamped seating engagement between the tapered circumference of the closure part 13 and the seat 23, as is shown in Figure 2 of the drawing.

An extremely important feature of the invention is the mechanical compression of the gasket throughout annular zones at each side of the annular groove or recess 40. Thus, as shown in Figure 2, an annular rib 50 is provided on the upper surface 41 of the closure part 13 which compresses the gasket flange 35 throughout an annular zone when the parts 12 and 13 are clamped together. This reduction of thickness of the gasket flange 35 effects a seal which prevents escape of fluid pressure. Also a similar annular rib 52 is provided on the tapered circumferential surface of the part 13 below the annular groove 40, which compresses the gasket at this annular zone against the seat 23 upon clamping assemblage of the closure in the tank 10. It is to be particularly noted that this rib 52 projects beyond the tapered annular seating surface of the part 13 in order to effect reduction in thickness of the gasket part 36.

With the closure B seated in the tank the locking ring 15 is lowered and turned either by spanner wrench or suitable handles 55 into the screw threaded socket provided in the top of the tank body. This clamps the ring 15 against the closure and forces the latter downwardly against the tapered seat 23, mechanically compressing the flange 36 against the seat 23 between the same and the part 13, because the wall thickness of said flange is greater than the width of the space between the part 13 of the closure and the seat 23. The gasket is additionally compressed by reduction of thickness at the location of the rib 52.

As pressures are built up within the tank they will pass through the ducts 43 into the groove 40 tending to inflate the gasket, or rather compressing the gasket at its inner surface between the rib zones 50 and 52, forcing the gasket into tight sealing contact across the juncture of the closure part 12 with the seat 23 of the tank body and effecting a seal which precludes escape of any of the tank contents.

From the foregoing it will be apparent that an improved liquefier has been provided wherein the closure and gasket assemblage are not only practical, but so arranged that internal pressures transmitted against the inner side of the gasket, caused by gasification in the liquefier, will confine the inflation pressure of the gasket entirely at the inner side of the gasket due to the annular lug restriction, which prevents the gasket from moving.

Various changes in the shape, size, and arrangement of parts may be made to the form of invention herein shown and described, without departing from the spirit of the invention or the scope of the claims.

I claim:

1. The combination of a tank body having an opening thereto provided with a tapered downwardly convergent seat, a closure construction for said seat having a tapered downwardly convergent peripheral surface, a gasket in mechanically compressed engagement between the tapered surfaces of the closure construction and its seat, said closure construction having port means formed therewith to transmit pressures existing within the tank directly against a narrow circumferential zone at the inner side of the gasket for forcing it into compressed seating and sealing engagement against the tapered seat of the tank body.

2. In a tank for holding fluids under superatmospheric pressure, a tank body having an opening thereinto, a closure for the opening, a flexible gasket in mechanical clamped compression between the closure and tank when the former is in position, means for directing pressures existing within the tank throughout a circumferential zone against the inner side of the gasket to further compress it in sealing contact with the tank body, and means to mechanically compress the gasket in sealing contact between the closure and tank at a location between said zone and the inside of the tank, said closure being free of other joints exposed to the inside of said tank except at the location where the gasket is mechanically compressed between the tank and closure.

3. In a tank adapted to receive high pressures the combination of a tank having an opening thereto and a tapered downwardly convergent seat, a closure for the seat having a tapered downwardly convergent surface for seating action with said seat, an inflatable gasket clamped between the closure and the tank seat, an annular compressing rib for compressing the gasket to effect a seal between the closure construction and its seat, and means for inflating the gasket by the pressures existing within the tank, at a location beyond said rib, into sealing contact at the juncture of the closure construction with said seat.

4. In a closure construction for high pressure tanks the combination of a pair of complementary closure parts having means to releasably clamp the same together, an inflatable gasket including a portion clamped between said parts and another portion in seating engagement around the outer periphery of at least one of said parts, said closure having ports therein leading to the inner surface of the gasket for transmitting inflating pressures thereto, and means to compress the gasket into sealing relation with a tank seat when the closure is in the tank at peripheral zones at each side outwardly and inwardly of the location where the pressure acts to inflate the gasket.

5. In a tank construction the combination of a tank body having a seat therein, a closure comprising outer and inner parts, means to clamp the parts together, a gasket having a portion clamped between the parts of the closure and a second part peripherally contacting at least one of the parts of the closure in position to be clamped in sealing engagement with the seat of the tank upon seating of the cover in the tank, means to transmit tank pressures to the inner side of the gasket, a gasket compressing ring between the closure parts to provide a zone of additional compression upon the gasket portion lying therebetween, and a gasket compressing ring between the closure and the tank seat at a location inwardly of the location where the tank inflating pressures act against the inner surface of the gasket.

6. In a tank for holding fluids under superatmospheric pressure, a tank body having an opening thereinto and a gasket seat facing said opening, a closure for the opening having a portion adapted to overlie said gasket seat, a flexible gasket mechanically clamped and compressed between said closure portion and said seat at spaced zones directly upon and surrounding said seat with an intermediate zone surrounding the seat not under such mechanical compression, and means for directing fluid pressures existing within the tank against the inside of the gasket at said intermediate zone for pneumatically compressing the said gasket at said intermediate zone against the tank gasket seat.

7. In a high pressure container the combination of a tank body having an opening thereto and a gasket seat therein, a closure plate movable into said opening having a surface thereof in closely spaced relation with respect to said seat when it is disposed within the opening, said space being the only joint between the closure and the tank body which receives any pressure from within the tank, a gasket clamped in said space with its outer and inner sides respectively facing said seat and closure plate surface and in mechanical compressed seating engagement therewith, means to vent pressures existing in the tank against the inner side of the gasket for expanding the same into sealing relation at said seat and across the juncture of the closure with the tank, said closure plate adapted to be lowered into the tank body for effecting the above mentioned mechanical compression of the gasket without rotational movement thereof, and means to releasably clamp said closure plate and hold it in said gasket compressing relation without the necessity of rotating said plate.

8. In a liquefier tank or the like the combination of a high pressure resistant tank body having an opening thereto and a seat in said opening tapering convergently towards the inside and bottom of the tank, a closure having a peripheral surface adapted to face said tapered seat of the tank body in complementary slightly spaced relation thereto, a gasket mechanically compressed directly upon and between the tapered seat surface of the tank body and said peripheral surface of the closure, said gasket being supported and mounted upon said closure and in direct engagement with said peripheral surface, said closure having port means therein open to the interior of the tank and open to the interior of the gasket for directing pressures existing within the tank against the inner side of the gasket upon a restricted zone for further compressing the gasket against the tapered surface of the tank seat.

9. The combination of a tank body having an opening thereto and having a seat therein facing outwardly towards the opening, a closure construction for said seat having a surface facing said seat in closely spaced relation thereto, a gasket in mechanically compressed engagement between the seat surface of the tank and said closely spaced surface of the closure construction, the closure construction in the surface thereof against which the gasket is compressed having a narrow endless duct narrower than said gasket and extending around and directly facing the inside of the gasket, said closure construction having port means therein communicating with said duct to transmit pressures existing within the tank directly into the duct against the inner side of the gasket for forcing it into compressed seating and sealing engagement against the seat of the tank body.

10. The combination of a tank body having an opening thereto provided with a seat surface facing outwardly, a closure construction for said seat having a surface facing and spaced closely with respect to said seat surface, a gasket having opposed inner and outer surfaces in respective mechanically compressed engagement with and between the said surfaces of the closure construction and seat, means on the closure plate to transmit pressures existing within the tank directly against the gasket at a zone within the limits of said seat for forcing it into further compressed seating and pressure sealing engagement upon said seat and means additionally mechanically compressing the gasket in sealed relation at a point outwardly beyond said zone to prevent leakage of the tank pressures therepast.

11. The combination of a tank body having an opening thereto provided with a seat facing outwardly, a closure construction for said seat having a surface facing and spaced closely with respect to said seat, a gasket in mechanically compressed engagement with and between the said surfaces of the closure construction and seat entirely around the joint between the tank body and closure construction, and means to transmit pressures existing within the tank directly against the side of the gasket which is engaged with the surface of the closure construction at a narrow zone surrounding said gasket and within the mechanically compressed area for forcing the gasket into further compressed seating and sealing engagement at the said joint between the tank body and closure construction.

12. The combination of a tank body having an opening thereto provided with a tapered seat, a closure construction for said seat, a gasket in compressed engagement with and between the tapered seat and a facing surface of the closure construction, means to clamp the closure upon the tank body so that the said gasket is in mechanical compression between said tapered seat surface and the facing surface of the closure, said closure having port means formed therein to transmit pressures existing within the tank directly against the inner side of the gasket at a certain zone for additionally forcing it into compressed seating and pressure sealing engagement against said tapered seat.

13. The combination of a tank body having an opening thereto provided with a tapered seat, a closure construction for said seat, a gasket between the tapered seat and a facing surface of the closure construction, means to clamp the closure upon the tank body so that the said gasket is in mechanical compression with and between said tapered seat surface and said facing surface of the closure, said closure having port means formed therein to transmit fluid pressures existing within the tank directly against the inner side of the gasket at a certain zone for additionally forcing it into compressed seating and pressure sealing engagement against said tapered seat, and an annular gasket compression ring between the gasket receiving surface of the closure and the tapered seat additionally mechanically compressing the gasket portion between the closure surface and the tapered seat in order to prevent leakage of pressures through the joint between the closure and tank.

14. In a liquefier tank or the like the combination of a high pressure resistant tank body having an opening thereto and a seat in said opening tapering convergently towards the inside of the tank, a closure having a peripheral surface adapted to face the tapered seat in the tank body in complementary spaced relation thereto when the closure is assembled upon said tank, a gasket mechanically compressed directly upon and between the tapered seat surface of the tank body and said peripheral surface of the closure, said closure having port means therein open to the interior of the tank and open to the inside surface of the gasket at the said peripheral surface of said closure for directing pressures existing within the tank against the inner side of the tank gasket upon a restricted zone circumferentially surrounding said tapered seat for further compressing the gasket against said tapered seat, said closure being of a nature to be moved by direct rectilinear action for compressing the gasket upon the tapered tank body seat without the necessity of turning said closure, and a clamping device having a clamping connection with the tank and free to move independently of the closure for contacting the latter in order to move it into rectilinear clamping action against the gasket upon said tapered seat.

15. In a tank for holding fluids under superatmospheric pressure a tank body having an opening thereinto, a closure for the opening, a flexible gasket in circumferential mechanically clamped compression between the closure and tank when the former is in position in the tank body, means for directing pressures existing within the tank throughout a circumferential zone against the inner side of the gasket to further compress it in sealing contact with the tank body, means to additionally mechanically compress the gasket in sealing contact between the closure and tank at a location at each side of said zone circumferentially about said closure, said closure being free of other joints exposed to the inside of said tank except at the first location above mentioned where the gasket is mechanically compressed between the tank and closure.

16. In a closure construction for high pressure tanks the combination of a top plate, a bottom plate, means to clamp said plates together, a channel-shaped gasket having a portion clamped between said plates and another portion extended in close fitting contact around the outer periphery of the lower closure plate, said lower closure plate having port means therein for transmitting pressures from the inside of a tank on which the construction is used to the inner surface of the portion of the gasket which fits around the outer periphery of said lower closure plate, said lower plate except for said port means being otherwise imperforate so far as outlet upon the under-surface of said plate is concerned.

17. In a closure construction for high pressure tanks the combination of a top plate, a bottom plate, means to clamp said plates together, a channel-shaped gasket having a portion clamped between said plates and another portion extended in close fitting contact around the outer periphery of the lower closure plate, said lower closure plate having port means therein for transmitting pressures from the under-side of said plate to the inner surface of the portion of the gasket which fits around the outer periphery of said lower closure plate, said lower plate except for said port means being otherwise imperforate so far as outlet upon the under-surface of said plate is concerned, said lower plate having its outer periphery whereon the said gasket portion is seated shaped in a downwardly convergent direction towards the lower surface thereof.

18. In a closure construction for high pressure tanks the combination of inner and outer closure parts, a gasket having a portion to fit between said parts and a portion extending in contact around the outer periphery of at least one of said closure parts, and means to clamp said parts together to compress the portion of the gasket therebetween, said inner closure part having ducts therein for transmitting pressures from the under side of the closure against the gasket's inner surface at a restricted zone surrounding said gasket.

JOHN FREDERICK BOWERS.